Dec. 10, 1968  H. REISMAN  3,415,206
PRETZEL FORMING
Filed March 31, 1965  5 Sheets-Sheet 1
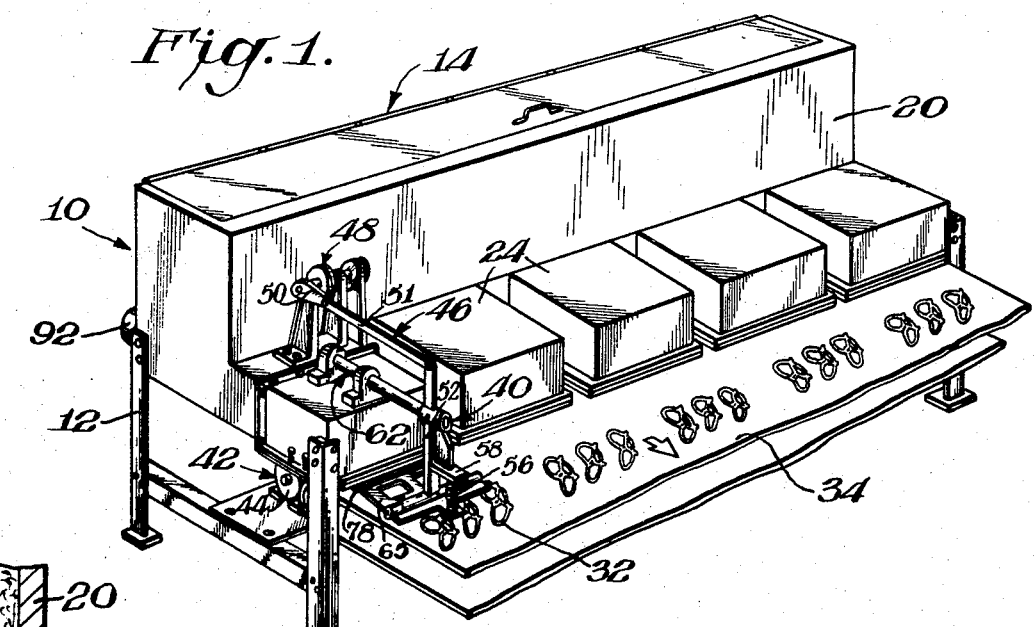
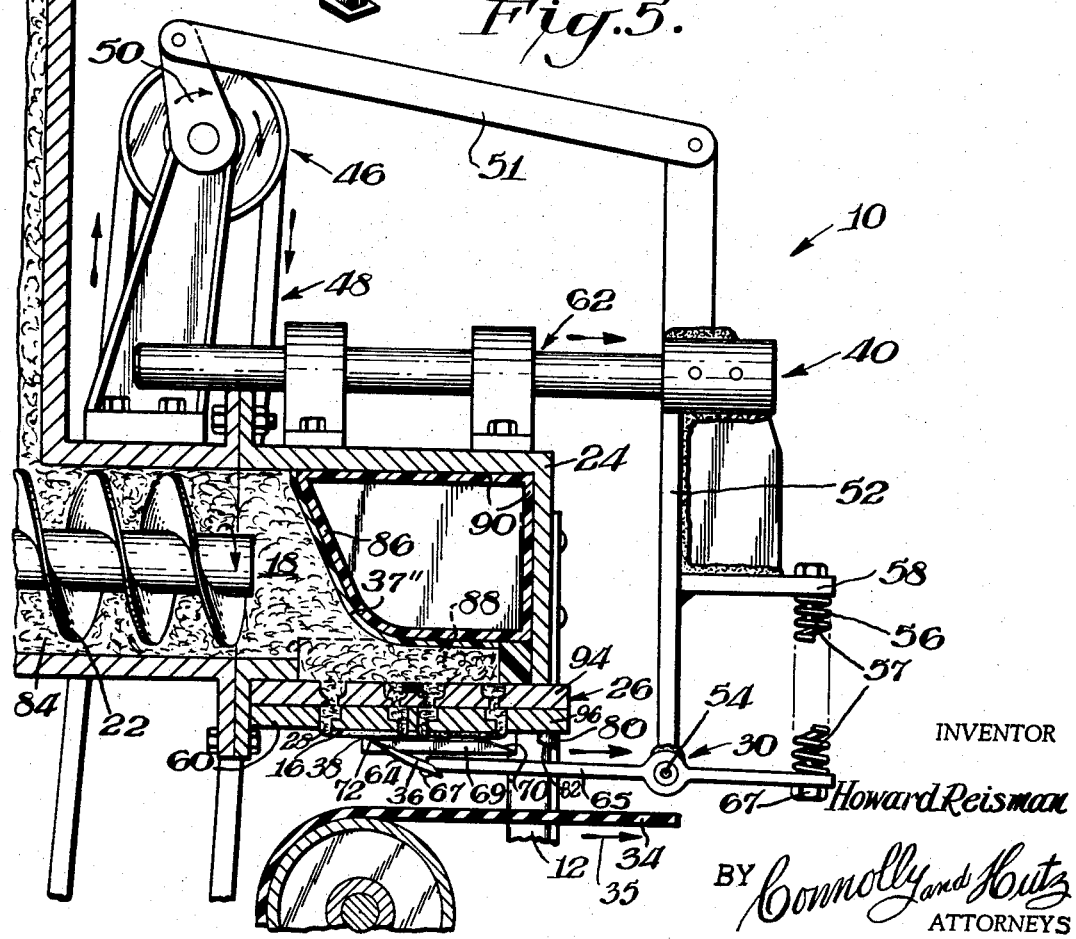
INVENTOR
Howard Reisman
BY Connolly and Hutz
ATTORNEYS

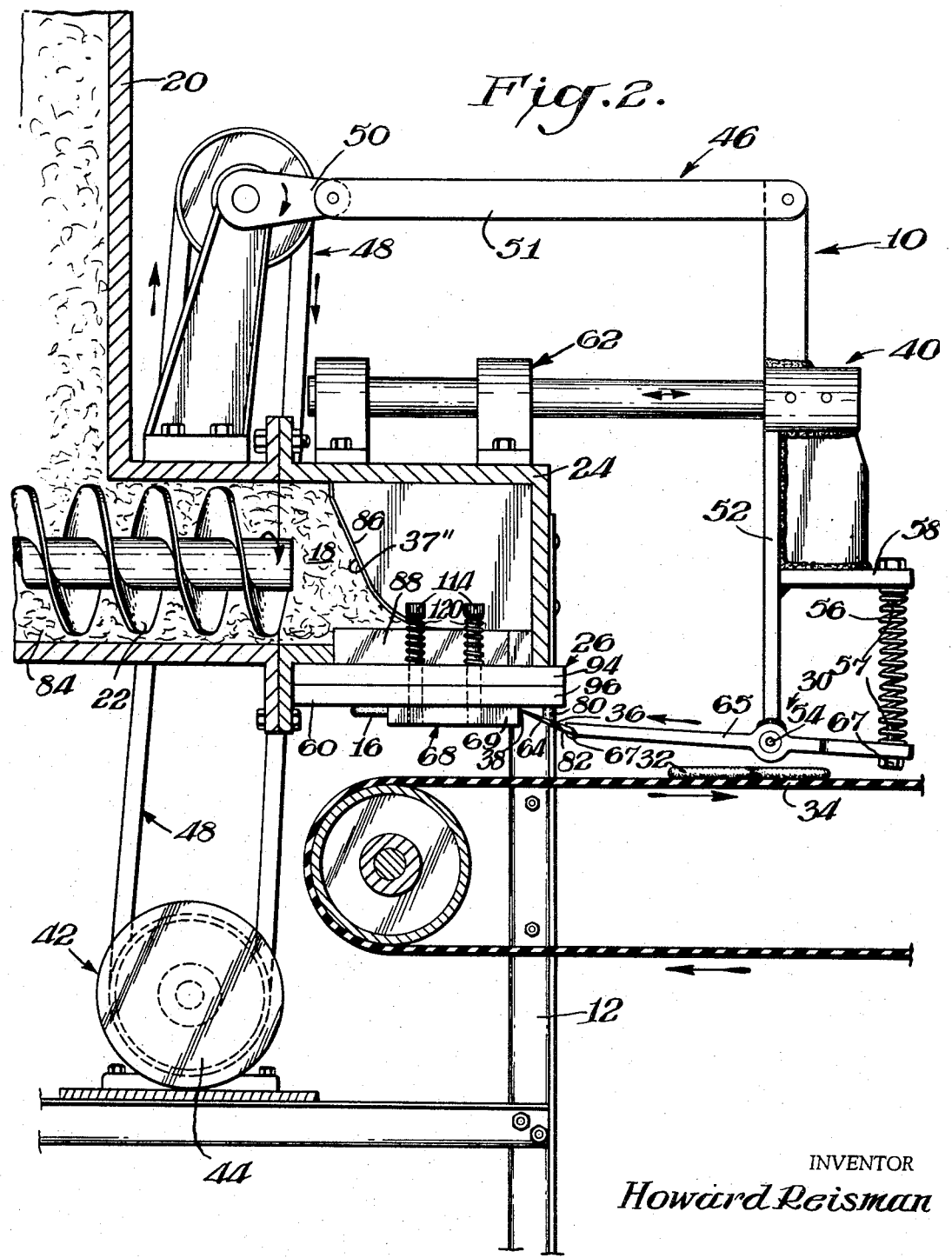

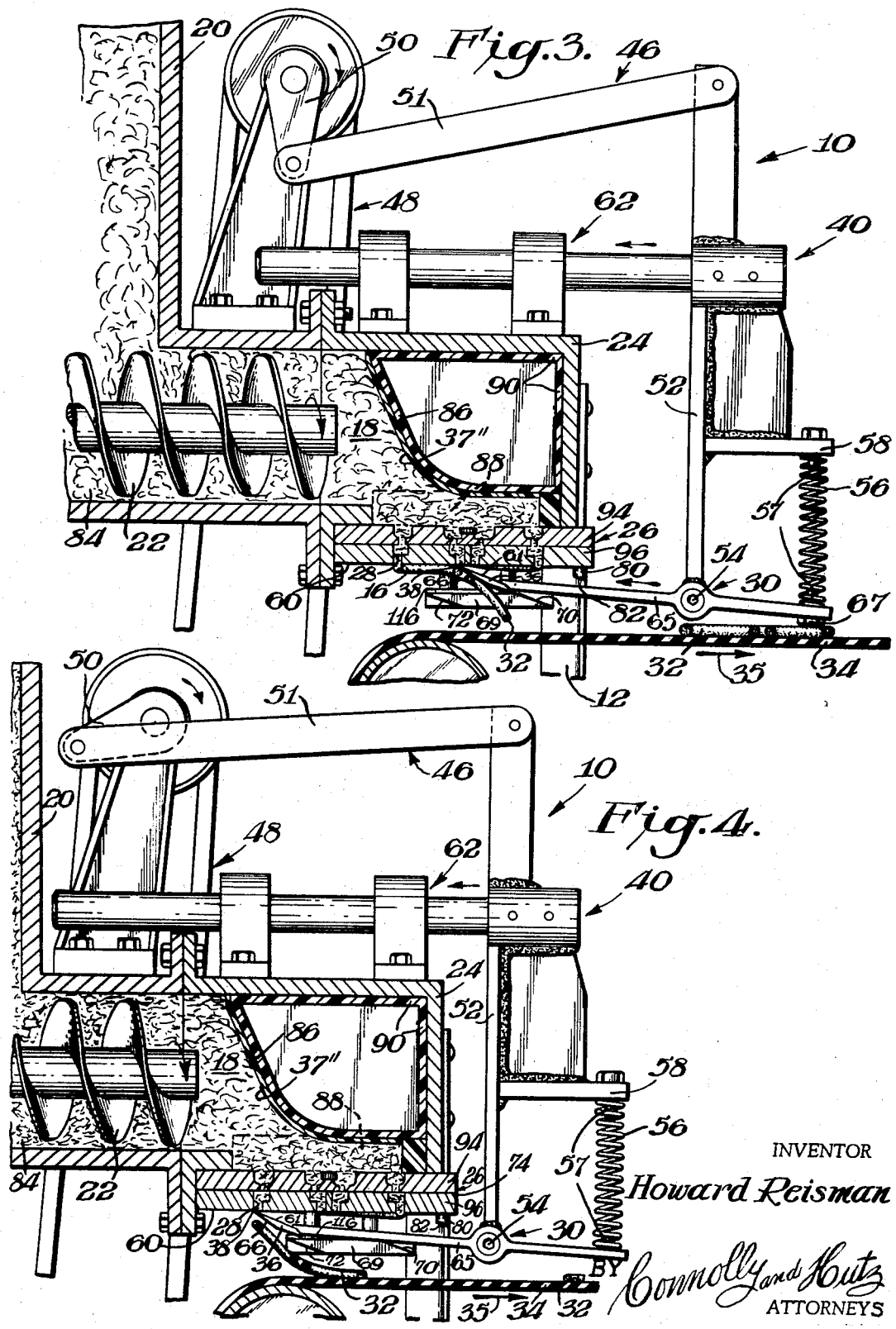

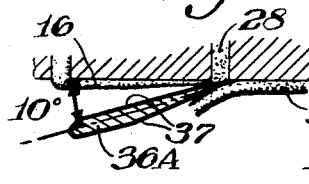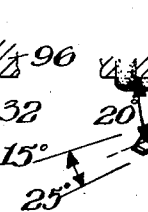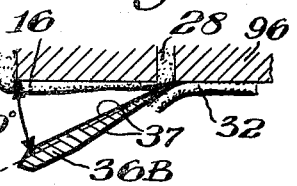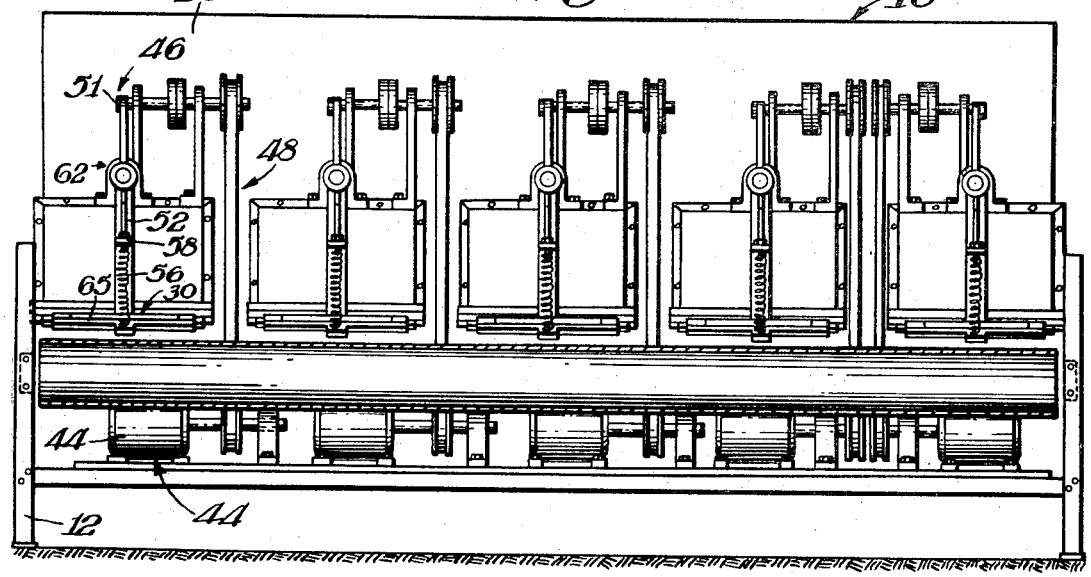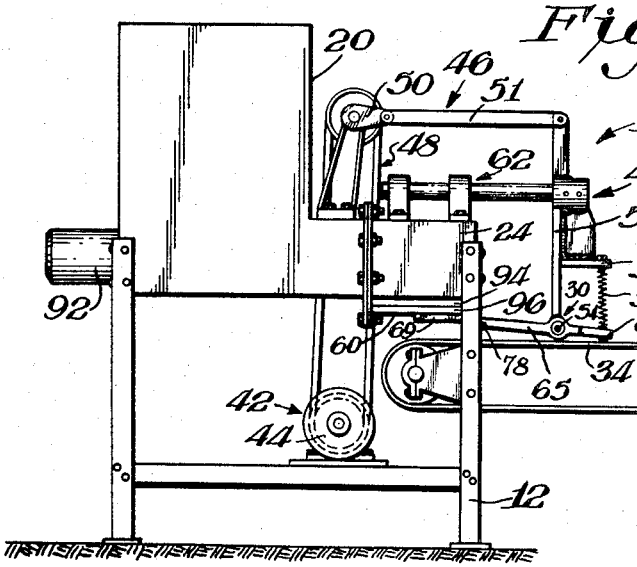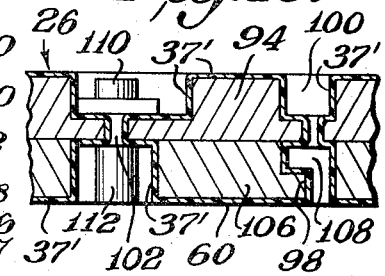
INVENTOR
Howard Reisman
BY Connolly and Hutz
ATTORNEYS Dec. 10, 1968    H. REISMAN    3,415,206
PRETZEL FORMING
Filed March 31, 1965    5 Sheets-Sheet 5
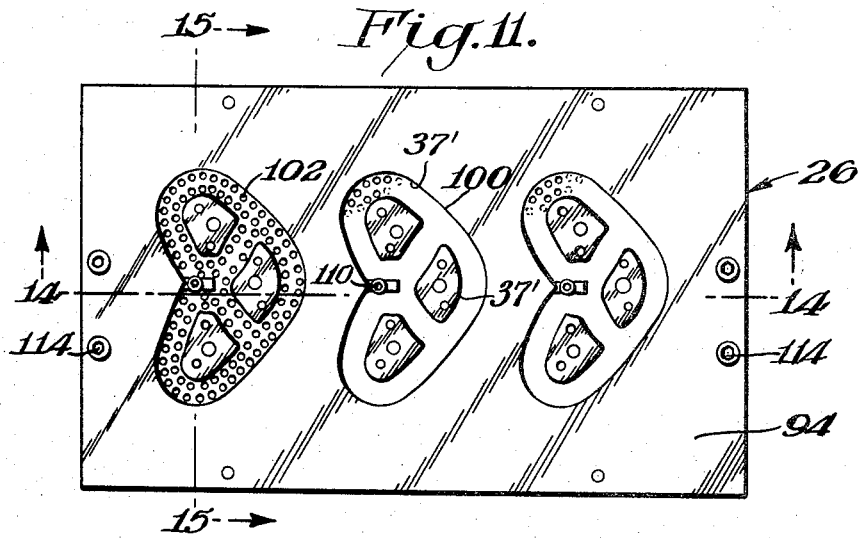
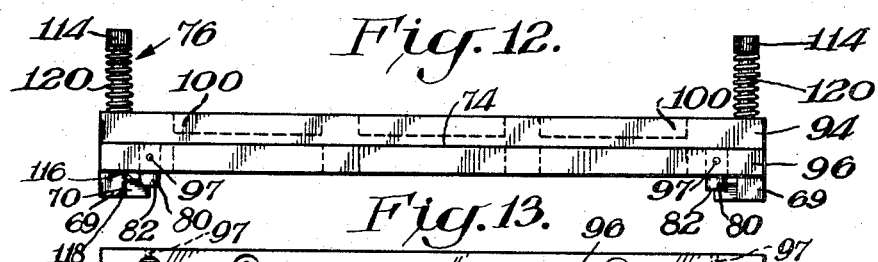
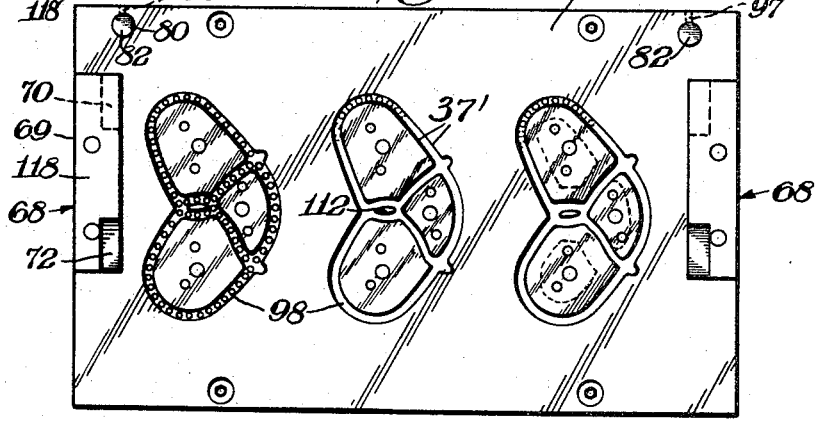
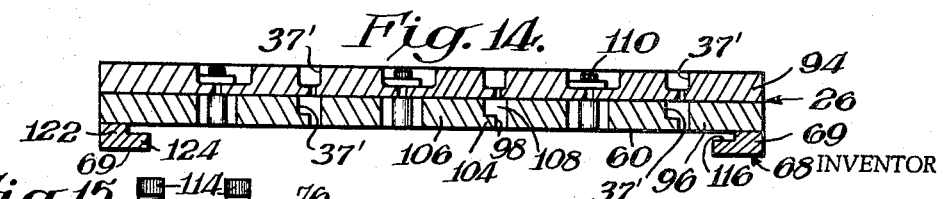
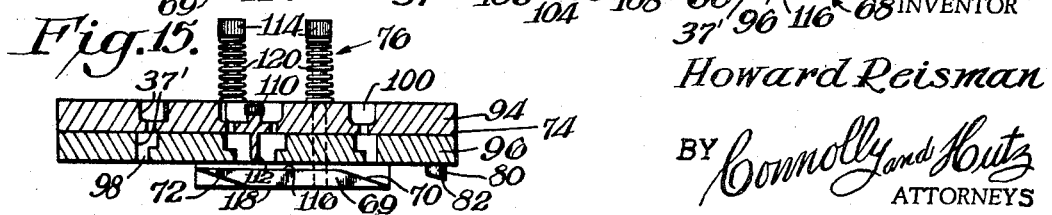
INVENTOR
Howard Reisman
BY Connolly and Hutz
ATTORNEYS

United States Patent Office 3,415,206
Patented Dec. 10, 1968

3,415,206
PRETZEL FORMING
Howard Reisman, Philadelphia, Pa.
(1417 Georgian Drive, Moorestown, N.J. 08057)
Filed Mar. 31, 1965, Ser. No. 448,908
50 Claims. (Cl. 107—14)

ABSTRACT OF THE DISCLOSURE

A stream of dough is extruded and cut off into pretzel-shaped articles. The flow resistance and extruding pressures are minimized by suitably shaping and arranging the extruder and knife and by coating dough-contacting surfaces with an antifriction means. The sharp edge of the knife is pushed in contact across the extruding plate with its blade disposed at an angle to it. The individual articles are cleanly severed and deflected from the stream with remarkably slight distortion and minimal obstruction to the flow of dough.

A chamfered lower edge upon the blade of the knife helps it cleanly cut and deflect the severed articles. The knife is retracted from the extrusion plate during its return stroke by a resilient set of cams. Cushioning pins at the front of the extruding plate catch the blade of the knife at the beginning of its forward stroke and smoothly slide the edge into contact with the plate. A particularly effective antifriction surface for practicing this invention is provided by a tetrafluoroethylene polymer. The knife is thinly coated approximately to a thickness ranging from 1 to 2 mils to prevent the dough from sticking to it without interfering with its cutting action.

The dough is channeled through the extrusion plate at right angle to its direction of feeding by an antifriction convex surface that guides the dough between separating walls of antifriction material into separate forming orifices.

A uniquely simple and efficient extruding plate includes an outer plate with forming channels connected to an inner plate with straining holes that are smaller than the channels to trap any hard globs of dough and prevent them from obstructing the channels. The length of the straining holes is minimized and the cross sections of inner portions of the forming channels are widened to minimize resistance to flow. They are also accordingly coated with an antifriction means. The channels are efficiently formed by fastening elements with overhanging walls upon the inner plate to space them from the walls of holes within the outer plate and thereby provide the forming channels.

This invention relates to a method and apparatus for forming shaped articles such as pretzels of unbaked dough, and it more particularly relates to such a method and apparatus of the extrusion type.

Various types of apparatus have been utilized for automatically forming pretzels. One of the most prevalent, as described in U.S. Patent 2,107,749, copies manual pretzel tying movements. It produces satisfactory products but is slow, complicated, expensive, space-consuming and necessitates close observation and attention to maintain it properly working. Extrusion type machines— as described in U.S. Patents 2,178,431, 2,188,799 and 2,660,131—are inherently faster in operation, but they have not been completely successful in forming pretzels that are as satisfactory in shape, appearance and taste as those made by other methods, primarily because of heretofore unsolved problems in the severing operation.

An object of this invention is to provide a fast, compact, automatic, efficient and dependable apparatus for forming articles such as pretzels of unbaked dough.

Another object is to provide an extrusion type of such an apparatus; and

A further object is to provide an extrusion type of such an apparatus that forms commercially attractive and tasteful pretzels without requiring dough of a critical consistency.

In accordance with this invention a remarkably efficient method and apparatus for forming shaped articles such as pretzels from unbaked dough utilizes a unique extrusion and knife cutting-off arrangement that produce remarkably attractive and tasteful pretzels at uniquely high speeds in a minimum of space and with very little operating attention. A stream of dough is accordingly extruded and cut off into pretzel-shaped articles in a manner that minimizes resistance to flow of the dough and accordingly the pressure applied to it. The flow resistance and extruding pressures are minimized by suitably shaping and arranging the extruder and knife and by coating critical surfaces with an antifriction means. The sharp edge of the knife is pushed in contact across the extruding plate with its blade disposed at an angle to it ranging approximately from 10 to 30°. The individual articles are cleanly severed and deflected from the stream with remarkably slight distortion and minimal obstruction to the flow of dough. This provides uniquely attractive and tasteful pretzels at a remarkably rapid rate of production.

The knife can be quickly reciprocated to cut off articles at a uniquely rapin speed ranging easily from 75 up to 300 articles per minute and even more. The main factors limiting the available rate of operation are the speed at which the dough can be extruded without damage and the capacity of available baking ovens. Dough of a wide range of consistency can be utilized in practicing this invention thereby yielding more control over its taste characteristics. The apparatus is simple, easily adjustable, compact and so dependable that it requires only superficial observation during operation. The space and labor requirements and resultant cost of operation are therefore uniquely low.

There are various specific features that are utilized in particularly efficient forms of this invention. They include a chamfered lower edge upon the blade of the knife that helps it cleanly cut and deflect the severed articles. The knife is retracted from the extrusion plate during its return stroke by a resilient set of cams. Cushioning pins at the front of the extruding plate catch the blade of the knife at the beginning of its forward stroke and smoothly slide the edge into contact with the plate. A particularly effective antifriction surface for practicing this invention is provided by a tetrafluoroethylene polymer. The knife is thinly coated approximately to a thickness ranging from 1 to 2 mils to prevent the dough from sticking to it without interfering with its cutting action.

An extruder with uniquely free flow characteristics is provided by channeling the dough through the extrusion plate at right angle to its direction of feeding by an antifriction convex surface that guides the dough between separating walls of antifriction material into separate forming orifices.

A uniquely simple and efficient extruding plate for use in this invention includes an outer plate with forming channels connected to an inner plate with straining holes that are smaller than the channels to trap globs of dough and prevent them from obstructing the channels. The length of the straining holes is minimized and the cross sections of inner portions of the forming channels are widened to minimize resistance to flow. They are also accordingly coated with an antifriction means. The channels are efficiently formed by fastening elements with overhanging walls upon the inner plate to space them from the walls of holes within the outer plate and thereby provide the forming channels.

Novel features and advantages of the present invention will become apparent to one skilled in the art from a reading of the following description in conjunction with the accompanying drawings wherein similar reference characters refer to similar parts and in which:

FIG. 1 is a perspective view of a pretzel forming apparatus that is one embodiment of this invention;

FIGS. 2–5 are partial cross-sectional views in elevation taken through the longitudinal axis of the corresponding portion of FIG. 1 in successive phases of operation;

FIG. 6 is a side view in elevation of the apparatus shown in FIG 1;

FIG. 7 is a front view in elevation of the apparatus shown in FIGS. 1 and 6;

FIGS. 8–10 are schematic diagrams of different angles of adjustment of the knife portion of the apparatus shown in FIGS. 1–7;

FIG. 11 is a top plan view of the extruding plate portion removed from the apparatus shown in FIGS. 1–7;

FIG. 12 is a front view in elevation of the extruding plate portion shown in FIG. 11;

FIG. 13 is a bottom plan view of the extruding plate portion shown in FIGS. 11 and 12;

FIGS. 14 and 15 are cross-sectional views taken through FIG. 11 along correspondingly numbered lines; and FIG. 16 is an enlarged fragmentary sectional view of a portion of FIG. 14.

In FIG. 1 is shown an apparatus 10 for forming pretzels of unbaked dough including a support frame 12 and an extruder 14 mounted upon it as also shown in FIGS. 2–7. Extruder 14 generates shaped streams 16 of unbaked doubh 18 contained within hopper 20 that is propelled by feed screws 22 into extruder heads 24. Five heads 24 are provided, and the following description is limited to only one of them because they are identical. This head 24 is provided with a knife assembly 30 and a drive 42 connected thereto by linkage 46; and being omitted in the illustration of the other heads in FIG. 1.

The pressure of feed screw 22 forces dough 18 through extrusion plate 26 mounted upon the bottom of extrusion head 24. Extrusion plate 26 includes shaped orifices 28 later described in detail in conjunction with FIGS. 11–15. Each orifice 28 controls the shape of the stream 16 that is intermittently severed by cutting knife assembly 30 to drop formed pretzels 32 upon conveyor belt 34.

Knife assembly 30 includes a knife blade 36 having a sharp edge 38 which is approximately from 0.015 to 0.020" thick to make it razor sharp. Knife assembly 30 is mounted for actuation upon carriage 40 that is supported upon frame 12 through a movable connection to extruder head 24. Power drive 42 including electric motor 44 is connected to actuate carriage 40 through a linkage 46. Drive 42 includes pulley and belt transmission 48. Linkage 46 includes crank 50 and connecting rod 51. Carriage 40 includes a bracket 52 to which knife assembly 30 is rotatably connected by pivot 54 having its axis disposed parallel to extrusion plate 26. Spring 56 reacts between knife assembly 30 and extension 58 of carrier bracket 52 to maintain edge 38 of knife blade 36 in forceful contact with the outer surface 60 of extrusion plate 26 as shown in FIG. 4. Carrier bracket 52 is connected for reciprocating movement upon support 12 through reciprocating shaft and bearing assembly 62 mounted upon the top of extruder head 24. The rotatable connections provided by shaft and bearing assembly 62 and pivot 54 cause blade 36 and its edge 38 to squarely align themselves with outer surface 60 of extrusion plate 26.

As shown in FIGS. 2–4, the various parts are arranged to push the sharp edge 38 of knife blade 36 in contact across outer surface 60 of extrusion plate 26 at an angle to the extrusion plate ranging approximately from 10° to 30° which facilitates the severing of shaped pretzels 32 as shown in FIGS. 3 and 4 without distorting them and without obstructing orifices 28. An angle between 15 and 25° is particularly effective in cleanly severing pretzel shape 32 without obstructing orifice 28. Antifriction means upon the surfaces of blade 36 particularly lower surface 64 cause the severed pretzel 32 to cleanly fall away from the blade 36. This antifriction surface is effectively provided by a sprayed coating 37 (shown in FIGS. 8–10) of a tetrafluoroethylene polymer such as Teflon, having a thickness of from one to two mils. Teflon is the trademark for a tetrafluoroethylene product sold by the Du Pont Company. This coating should be thin to avoid dulling the edge of the knife.

Knife assembly 30 includes a lever frame 65 that is rotatably connected to bracket 52 by pivot connection 54. Knife blade 36 is attached to the front of lever frame 65 by metal screws 67 at an angle of about 20° to outer surface 60 of extrusion plate 26.

FIG. 4 shows the chamfered bottom 66 of blade 36 which helps provide sharp edge 38 and helps deflect severed pretzels 32 away from stream of dough 16. As shown in FIGS. 3 and 4, the upper rim of conveyor belt 34 is horizontally disposed below extrusion plate 26 to cause severed pretzels 32 to drop vertically down upon it with a minimum of distortion. Conveyor belt 34 is accordingly disposed as close as possible to plate 26 that knife assembly 30 will permit to prevent pretzels 32 from striking it on edge and being distorted. Conveyor belt 34 is accordingly disposed approximately one and one-half inches away from extrusion plate 26 and operates most effectively for normal size pretzels when it is not more than approximately two inches away from plate 26.

Reciprocating linkage 46 that actuates knife assembly 30 in its forward and backward strokes also includes a retracting assembly 68 for removing knife edge 38 from extrusion plate 26 and dough stream 16 during the return stroke of the knife. Retracting assembly 68, as shown in FIGS. 2–5, includes a camming bar 69 having a slanted front surface 70 and a slanted rear surface 72 shown in FIGS. 3 and 4 that are downwardly inclined away from the forward edge 74 of extrusion plate 26. A series of loose couplings 76 shown in FIG. 15 connect bars 69 to extrusion plate 26 in a manner that allows bars 69 to be urged away from extrusion plate 26 when the lugs 78 on one end of blade 36 (shown in FIG. 1) pass (as shown in FIGS. 3 and 4) between it and extrusion plate 26.

Pins 80 below the front end 74 of extrusion plate 26 are made of a strong and resilient material such as a thermoplastic acetal resin. Delrin is the trademark for an effective material of that type made by the Du Pont Company. Retracting assembly 68 is shown in detail in conjunction with other features of extrusion plate 26 in FIGS. 11–15, which are later described. Cushion means are provided by pins 80 mounted under the front end 74 of extrusion plate 26. As shown in FIG. 2, they catch blade 36 in back of knife edge 38 before it returns into contact with extrusion plate 26 at the beginning of its forward stroke. Pins 80 are made of a resilient material to absorb the shock of contact of knife blade 36 and prevent edge 38 from being shattered and dulled by a strong impact upon the surface 60 of extrusion plate 26. Pins 80, as shown in detail in conjunction with extrusion plate 26 in FIGS. 11–15 later described in detail, are made of a strong resilient material such as Delrin. Their lower surface 82 is disposed at an angle substantially corresponding to the angle of blade 36 to smoothly guide the knife into contact with extrusion plate 26 at its operating angle. Pins 80 are adjustable in length as later described in detail and are set to catch knife edge 38 at a short distance for example $\frac{1}{32}$" away from surface 60 of extrusion plate 26. The smooth guidance of the blade into contact with surface 60 in conjunction with the sliding movement of the blade over extrusion plate surface 60 helps maintain edge 38 sharp by the resultant grinding or honing action over plate 60.

Extrusion heads 24 include a feeding channel 84 having a path of flow disposed at right angles to the path of flow of stream of dough 16 through extrusion plate 26. End wall 86 within head 24 is inclined at an angle intermediate to these paths of flow, and it is coated with an antifriction material 37″ such as a sheet of a tetrafluoroethylene polymer for smoothly diverting the flow through extrusion plate 26. End wall 86 is convexly curved in smooth connection with the central portions of the tops of bars 88 disposed between orifices 28 in extrusion plate 26. Bars 88 are made of solid antifriction material such as tetrafluoroethylene polymer to minimize resistance to flow of the dough and the pressure applied to it. Wall 86 is conveniently provided by connecting it to close the right angled walls 90 of a box type structure that is inserted within extruder head 24 in conjunction with spacer bars 88. These inserts conveniently provide smooth diverting and flow facilitating functions within a simple extrusion head 24.

FIGS. 8, 9 and 10 show various operative angles of adjustment of blade 36. A highly efficient orientation is shown in FIG. 9 in which the plane of blade 36 is disposed at an angle of approximately 20° to the surface 60 of extrusion plate 26. An extremely effective range of adjustment from approximately 15–25° to surface 60 is also illustrated in FIG. 9. FIG. 8 shows an extremely shallow angle of approximately 10° to surface 60 of blade 36A and FIG. 10 shows blade 36B at an extremely sharp angle of approximately 30° to extrusion plate surface 60. FIG. 9 illustrates optimum cutting action in which the dough is cut cleanly away from stream 16 as it issues from orifice 28. Articles 32 are accordingly smoothly severed and deflected away from plate 26 without distorting the shape of the stream and also their corresponding shape. FIG. 9 also shows how orifice 28 or any portion of its is not materially blocked by blade 36 because of its substantial angle of disposition to orifice 28. This prevents obstructions in the flow through the orifice and overdevelopment of the dough.

It has been discovered blade angles that are too shallow material block the exit of the dough in back of the cutting knife. Such blockage causes distortion and also overdevelopment of the dough. Excess pressure applied to unbaked dough makes it too hard, tacky and untasteful. Knife 36 should smoothly cut and sever without obstructing the orifice and the flow of dough behind it. This is important even though knife 36 is pushed very quickly across extrusion plate surface 60.

FIG. 8 shows an extremely shallow angle of blade 36A to extrusion plate 60A in which the passage of dough is somewhat more obstructed than in FIG. 9. Angles substantially shallower than the approximate 10° illustrated in FIG. 8 would not produce the remarkably undistorted, attractive and tasteful pretzels of this invention. FIG. 10 shows an extremely sharp angle of blade 36b of approximately 30° in which the bottom of the blade is at so great an angle to extrusion plate surface 60 that it starts to push dough stream 16. Substantially sharper angles than 30° distort the dough and prevent the clean severing action of this invention from being accomplished.

FIG. 6 shows the operative portions of apparatus 10 including motor 92 that drives conveyor screw 22. Adjustment of the speed of motor 92 controls the speed of issuance of the dough stream 16 relative to the speed of the knife and accordingly helps govern the thickness of the pretzels. Motor 44 below frame 12 governs the speed of knife carriage 40 and accordingly adjustment of its speed also governs the thickness of the pretzels cut and their rate of production.

The details of extrusion plate 26 and its auxiliary portions are shown in FIGS. 11–15. Extrusion plate 26 includes an inner straining palte 94 shown in plan in FIG. 11 and an outer forming plate 96 shown in plan in FIG. 13. Outer forming plate 96 includes forming channels 98 corresponding to the form of pretzels 32, and inner straining plate 94 includes enlarged feeding channels 100 for feeding dough to forming channels 98. Channels 100 are larger than channels 98 to minimize obstruction to the flow of dough and to provide full feeding to channels 98. A number of holes 102 are provided in feeding channels 100, and holes 102 are narrower than forming channels 98 for trapping any globs of hard dough that might obstruct forming channels 98. There are so many holes 102 that even if a few were obstructed sufficient flow of dough will still be provided to fill channel 98.

As shown in FIG. 12 feeding channels 100 are formed into inner straining plate 94 to a considerable depth to minimize the length of holes 102 and their resultant frictional resistance to the flow of dough. As shown in FIG. 14, forming channels 98 are provided by outer overhanging portions 104 of inserts 106 that are fastened to inner straining plate 94. The inner forming channel portions 108 are wider than the outer forming channel portions 98 to minimize the pressure exerted upon the dough. All of the active surfaces in extrusion plate 26 which contact the dough are also covered with an antifriction means 37′ as shown in FIG. 16 to minimize obstruction to flow of dough. This coating 37′ is provided by attachment of a strip of antifriction material such as tetrafluoroethylene or spraying. The thickness of coating 37′ is exaggerated in FIG. 16 to facilitate its illustration. Inserts 106 are connected to inner straining pate 94 by cap screws 110. Central inserts 112 are disposed between larger inserts 106 for providing the unique form of pretzel disclosed in design patent application Ser. No. 81,171 filed Aug. 5, 1964, now U.S. Des. Patent 208,899 by the same inventor.

Camming assemblies 68 are loosely coupled to outer surface 60 of outer forming plate 96 by coupling means 76 which include elongated cap screws 114 loosely inserted through inner straining plate 94 and engaged with camming bars 69. Bars 69 include inclined camming surfaces 70 and 72. Upper wall 116 of each bar 69 is spaced a short distance from extrusion plate surface 60 to facilitate the insertion of the lugs 78 of knife blade 36 that urge bar 69 out of the path of knife blade 36 during its forward stroke. When knife blade 36 moves backwardly in its recovery stroke, knife ends 78 move over the top of inclined camming surface 72 and over the lower surface 118 of camming bars 69 to remove knife 36 from extrusion plate surface 60 during its backward stroke. Camming bars 69 are returned to engagement with extrusion plate surface 60 during this portion of its stroke through the return action of springs 120 mounted about the stems of cap screws 114 that resiliently urge bar 69 back into contact with extrusion plate surface 60. The solid outer portions 122 of camming bars 69 provide means for engaging cap screws 114 to leave active camming portions 124 extended to engage the lugs 78 or follower portions of knife 36. These follower portions or lugs 78 are shown only in FIGS. 1 and 6. Pins 80 are retained in plate 96 by set screws 97.

*Operation*

Dough 18 is supplied to hopper 20 shown in FIG. 1 either manually or by an automatic conveyor system. As shown in FIG. 1 the apparatus of this invention is so compact that a number of extrusion heads 24 can be arranged side by side close to each other to feed pretzel shapes 32 that they extrude upon a common conveyor belt 34. This eliminates the necessity for providing separate conveyor belts from each individual forming apparatus, which is required with more bulky apparatus. Each extrusion head 24 includes three forming orifices 28, and it therefore drops three rows of pretzel forms 32 upon conveyor belt 34. The five heads illustrated therefore drop fifteen rows of formed pretzel shapes 32 upon conveyor belt 34, which is the equivalent to the production of fifteen of the tying type of pretzel forming apparatus previously discussed.

The operation of one extrusion head 24 and its associated knife carriage 40 is described in the following. The operation of each of the four other extrusion heads 24 is identical.

The sequence of operation starting from the extreme forward portion of the cutting stroke is illustrated in FIGS. 1–5. In FIG. 2 knife carriage 40 is in a similar position to that shown in FIG. 1 in which knife blade 36 is engaged with the bottom surface 82 of pins 80. The edge 38 of knife blade 36 is held a short distance such as 1/32" away from surface 60 of extrusion plate 26. Spring 56 urges knife 36 at all times in toward contact with extrusion plate 60. Spring 56 is held in place by cap screws 57 to react between extension 58 of bracket 52 and outer end 67 of knife lever frame 65.

In FIG. 2 is also shown the shaped stream of dough 16 issuing from orifice 28 (not shown). Dough stream 16 is propelled by screw 22 that is driven by motor 92 shown in FIG. 6, to propel dough 18 from hopper 20 through passageway 84. It is diverted by convex wall 86 for passage through extrusion plate 26. Wall 86 and spacer bars 88 have an outer surface of tetrafluoroethylene antifriction material to minimize frictional resistance to the dough within the hopper and thus prevent the dough from being overdeveloped. Too much pressure applied to dough overdevelops it and makes it tacky and not as tasteful as might be desired. The method and apparatus of this invention minimize the pressures applied to the dough and provide uniquely attractive pretzel forms 32 of tasteful dough whose consistency can be primarily directed to maximum taste properties. This is in contrast to other types of apparatus such as the tying form that requires dough of a much denser consistency that is not as tasteful. The same denser dough consistency is also required by heretofore existing types of extruding machines that use a wire to cut the dough. These wire cutters do not provide the remarkably clean and effective severing action of this invention. Pretzel forms cut by wire cutters are therefore neither as tasteful or as smooth and attractive in appearance without distortion as those of this invention.

In FIG. 2 apparatus 10 is in the extreme forward phase of its operation just ready for a forward cut of knife edge 38. A pretzel shape 32 is on the top of conveyor belt 34 moving in the direction of the arrows, and knife edge 38 is just ready to sever another pretzel form 32 from dough stream 16.

In FIG. 3 crank and connecting rod linkage 46 has advanced reciprocating knife carriage 40 toward extrusion head 24. Shaft and bearing support 62 in conjunction with pivot 54 cause its knife edge 38 to align itself squarely with extrusion plate surface 60. Knife edge 38 has severed approximately half of a pretzel form 32 from dough stream 16. During its forward movement from the position of FIG. 2, knife edge 38 has been smoothly guided into contact with extrusion plate surface 60 from pins 80. This smooth moving contact with surface 60 grinds or hones the edge 38 to maintain it sharp. This sharp edge and the angle of blade 36 of approximately to 20° the surface of extrusion plate 60 cleanly severs dough stream 16 without allowing chamfered lower edge 66 to push the dough and distort it. The top surface 61 of blade 36 is removed a sufficient distance from extrusion plate 60 to permit dough stream 16 to issue freely after passage of knife edge 38 without obstruction. This free passage of dough through orifice 28 in conjunction with the free passage of dough through extrusion head 24 prevents excess pressures from being applied to the dough within the extrusion head. Such excess pressure is caused by a blade in flat contact with surface 60, of the type shown in aforementioned U.S. Patents 2,178,431 and 2,188,799. The antifriction surface particularly on bottom surface or beveled bottom surface 66 of knife 36 cleanly severs individual pretzel forms 32 from dough stream 16 with a remarkably slight distortion and minimal obstruction of the flow of dough 16. This provides uniquely attractive and tasteful pretzels at a remarkable rate of production.

The final stage of forward movement of knife blade 36 is shown in FIG. 4. Knife edge 38 has cleared the rear portion of orifice 28 and dough stream 16. This drops a pretzel form 32 upon conveyor belt 34 which is moving ahead in the direction of arrow 35. The short distance of belt 34 from extrusion plate 60 (as close as possible to clear knife lever frame 65) prevents the formed pretzel 32 from turning and striking belt 34 on edge and becoming distorted. The forward movement of belt 34 in conjunction with its proximity to extrusion plate 60 also helps prevent distortion of the pretzel forms. Belt 34 is therefore for example positioned within one and one-half and two inches from extrusion plate 60.

FIGS. 3 and 4 also show knife blade 36 entered over the upper surface 116 of camming bar 69 on sections 124. This has moved camming bar assembly 68 against the force of springs 120, shown in FIG. 15, away from extrusion plate 60. This allows knife 36 to pass across in contact with extrusion plate 60. FIGS. 3 and 4 also show the stream of dough 16 that issues from orifice 28 in back of the passage of knife edge 38 even though knife edge 38 moves with great speed.

FIG. 5 shows a further movement of crank and connecting rod linkage 46 to move knife carriage 40 in a backward direction as shown by the arrows. Knife edge 38 has moved over the inclined rear camming surface 72 of bar 69 to retract or remove knife edge from extrusion plate 60 during its rearward movement. This permits the dough stream to continue issuing through orifice 28 during the backward movement of knife 36 without any interference from knife blade 36. This permits it to issue to the full thickness of a pretzel form while knife blade 36 and knife edge 38 are returning for another forward stroke to the position shown in FIG. 2. The aforementioned sequence of operation is then repeated to drop another row of pretzel forms 32 upon conveyor belt 34. The antifriction surface on the knife 36 prevents any of the dough from sticking to it thereby maintaining the sharpness of the knife and cleanly deflecting severed articles 32 from stream 16 with remarkably slight distortion.

Adjustments of the thickness of the pretzels and the rate of production are obtained by controlling the speed of motor 92 for conveyor screw 22 and of motor 44 that operates drive 42 including belt and pulley drive 48.

Extrusion plate 26, as shown in FIGS. 11–15, is efficient in operation and easily removed for cleaning. The antifriction surfaces covering its channels also prevents excessive pressures from being exerted upon the dough during forming. This pressure control is aided by the generous internal sections of its feeding channels 100 leading to forming channels 98, particularly in the enlarged entrances 108 to forming channels 98. Straining holes 102 prevent globs of dough from clogging forming channels 98, and there are enough of them to completely fill forming channels 98 even though some are clogged. Holes 102 are maintained short because of the appreciable depth of feeding channels 100. This prevents them from exerting too much frictional resistance and resultant pressure upon the dough.

Too much pressure on the dough increases the fermentation rate and kills its life. It overdevelops the gluten which is the binder in the dough. If the gluten develops too much, the dough gets sticky and tacky which damages its taste and makes it difficult to handle. To make other types of forming apparatus operate properly, the formulation of their dough is dictated by its handling characteristics at some sacrifice of its taste qualities. This however is not required in the practice of this present invention because of the minimal pressures applied throughout to the dough.

The method and apparatus of this invention are so simply practiced, rapid, easily adjustable and dependable that they required only superficial observation during operation. The small space requirements of its compact apparatus as illustrated in FIG. 1 also contributes to the simplicity, economy of structure and economy of operation of apparatus of this invention. It can produce a quantity of pretzel forms with approximately only half the labor and much less space than that previously required. Its pretzels are also even more tasteful and more attractive than those previously available. The apparatus of this invention is so rapid and efficient in operation that existing baking oven capacity is more than exceeded by a unit of the type described in FIG. 1 operated at a speed of only seventy-five strokes per minute which is the low end of its operating range.

What is claimed is:

1. An apparatus for forming shaped articles of unbaked dough comprising a support, extrusion means upon said support for generating a shaped stream of said dough, an extrusion head upon said extrusion means, an extrusion plate upon said extrusion head including a shaped orifice through which said stream of dough flows, a knife means having a blade with a sharp edge, carriage means upon said support, said knife means being mounted upon said carriage means for passage across said extrusion plate, drive means, linking means connecting said drive means to said carriage means for actuating its movement, said carriage means being arranged to quickly push the sharp edge of said knife means in contact with and across said extrusion plate with said blade disposed at an angle to said extrusion plate ranging approximately from 10 to 30° whereby said shaped articles are cleanly severed and deflected from said stream without obstructing its flow through said orifice, and antifriction means upon the surface of said blade remote from extrusion plate whereby the severed articles are caused to freely fall away from said blade.

2. An apparatus as set forth in claim 1 wherein the bottom of said blade adjacent said edge is chamfered to help form said edge and to help deflect said severed articles away from said stream.

3. An apparatus as set forth in claim 1 wherein said extrusion plate is horizontally disposed below said extrusion head for vertically dropping said articles down from it with a minimum of distortion.

4. An apparatus as set forth in claim 3 wherein a conveyor means is disposed under said extrusion plate for catching said severed and deflected articles.

5. An apparatus as set forth in claim 4 wherein said conveyor means is disposed close enough to said plate to prevent said articles from striking it on edge and being distorted.

6. An apparatus as set forth in claim 5 wherein said conveyor means is disposed not more than approximately two inches away from said extrusion plate.

7. An apparatus as set forth in claim 1 wherein said carriage means comprises a reciprocating linkage, said linkage including means for pushing said knife means in a forward stroke in contact across said extrusion plate, and said linkage including retracting means for removing said knife means during its return stroke away from said extrusion plate and said stream of dough.

8. An apparatus as set forth in claim 7 wherein cushion means is mounted upon the end of said extrusion plate where said knife means returns into contact with it at the beginning of said forward stroke, and said cushion means being disposed for catching the portion of said blade in back of said edge before said edge contacts said extrusion plate whereby the impact of said edge upon said extrusion plate, is cushioned.

9. An apparatus as set forth in claim 7 wherein said retracting means includes a cam means mounted upon said extrusion plate, and follower means are mounted upon said knife means for engaging said cam means.

10. An apparatus as set forth in claim 9 wherein said cam means comprises a bar having front and rear surfaces that are downwardly inclined away from said extrusion plate toward the forward end of said extrusion plate, loose coupling means attaching said bar upon said extrusion plate, and resilient means urging said bar into contact with said plate for allowing said bar to be moved away from the surface of said extrusion plate when said follower means enters between said bar and said extrusion plate during the forward stroke of said knife means and for causing said follower means to pass over said bar during the return stroke of said knife means thereby removing said knife means from said extrusion plate and said stream of dough during said return stroke of said knife means.

11. An apparatus as set forth in claim 1 wherein said angle of said blade ranges approximately from 15 to 25°.

12. An apparatus as set forth in claim 7 wherein said carriage means includes rotatable coupling means having an axis of rotation substantially parallel to the plane of said extrusion plate, said rotatable coupling means connecting said knife means to said reciprocating linkage, and resilient means reacting between said knife means and said carriage means for urging said edge into contact with said extrusion plate.

13. An apparatus as set forth in claim 12 wherein said linkage includes a knife-supporting bracket, said rotatable coupling means connecting said knife means to said bracket, and spring means reacting between said knife means and said bracket for resiliently urging said edge into contact with said extrusion plate.

14. An apparatus as set forth in claim 13 wherein reciprocating rod and bearing means mount said bracket upon said support, said linking means comprise a crank and connecting rod, and said antifriction means is applied to both sides of said blade of said knife means to prevent said dough from sticking to it.

15. An apparatus as set forth in claim 14 wherein said antifriction means comprises a coating of a tetrafluoroethylene polymer.

16. An apparatus as set forth in claim 15 wherein said coating is approximately 1 to 2 mils thick.

17. An apparatus as set forth in claim 1 wherein said extrusion means includes flow passages, and said antifriction means is also disposed in said flow passages for minimizing the pressure said extrusion means applies to said dough.

18. An apparatus as set forth in claim 1 wherein said extrusion plate includes an inner straining plate and an outer forming plate, said outer forming plate having forming channels corresponding to the form of said shaped articles, and said inner straining plate having larger corresponding feeding channels including holes narrower than said forming channels for trapping globs of dough that might obstruct said forming channels.

19. An apparatus as set forth in claim 18 wherein said forming channels through said outer forming plate comprise the inner walls of holes in said outer forming plate having a shape corresponding to the outer periphery of said stream, the outer walls of inserts corresponding in shape to the inner portions of said stream, and said inserts being connected to said inner straining plate.

20. An apparatus as set forth in claim 19 wherein said channels and portions of said straining plate that contact said dough are coated with antifriction means.

21. An apparatus as set forth in claim 1 wherein said extrusion head includes a feeding channel having a path of flow disposed at right angles to the path of flow of said stream through said extrusion plate, an end wall within said extrusion head for diverting the path of flow of said dough from said feeding means through said extrusion plate, and said end wall being coated with an antifriction means for minimizing the pressure applied to said dough.

22. An extrusion plate for shaping a stream of unbaked dough comprising an inner straining plate and an outer forming plate, said outer forming plate having forming channels corresponding to the form of said shaped stream of dough, said inner straining plate having feeding channels larger than said forming channels and corresponding to the shape of said forming channels, and said feeding channels including holes narrower than said forming channels for trapping globs of dough that might obstruct said forming channels.

23. An extrusion plate as set forth in claim 22 wherein said forming channels through said outer forming plate comprise the inner walls of holes in said outer forming plate having a shape corresponding to the outer periphery of said stream, inserts disposed inside and spaced from said inner walls, the outer walls of said inserts corresponding in shape to the inner portions of said stream, and said inserts being connected to said inner straining plate.

24. An extrusion plate as set forth in claim 23 wherein said channels and active portions of said straining plate which are disposed in contact with said dough are coated with antifriction means.

25. An extrusion plate as set forth in claim 24 wherein the downstream portion of said inserts overhang their upstream portions to make the upstream portions of said forming channels wider than the downstream portions of said forming channels thereby minimizing the pressure exerted upon said dough.

26. An extrusion plate as set forth in claim 22 wherein said feeding channels in said inner straining plate have a substantial depth to minimize the length of its holes.

27. An extrusion plate as set forth in claim 22 wherein the upstream portions of said forming channels are wider than their downstream portions for minimizing pressure exerted upon said dough passing through them.

28. An extrusion head for generating a stream of unbaked dough comprising an extrusion plate upon said extrusion head having a shaped orifice, a feeding channel having a path of flow disposed at right angles to the path of flow of said stream through said extrusion plate, an end wall within said extrusion head for diverting the path of flow of said dough from said feeding channel through said extrusion plate, and said end wall being coated with an anti-friction means for minimizing the pressure applied to said dough whereby overdevelopment of said dough is prevented.

29. An extrusion head as set forth in claim 28 wherein said extrusion plate includes a number of laterally spaced dividing walls within said extrusion head between a number of said shaped orifices, and antifriction means upon said walls for minimizing the pressure applied to said dough.

30. An extrusion head as set forth in claim 29 wherein said dividing walls comprise a number of bars inserted between said shaped orifices and said end wall comprises a convexly curved wall that is disposed at an intermediate angle which smoothly connects said paths of flow and smoothly joins the tops of said bars in a smooth curve at approximately their central portions for smoothly diverting the dough into said spaces between said bars.

31. A method of forming shaped articles which comprises cutting the articles with sharp edge of a knife blade from a stream of dough issuing from an extruder, the knife blade and dough-contacting surfaces and extrusion orifices of the extruder being coated with antifriction means to minimize pressure applied to the dough, and pushing said sharp edge of said knife in contact across the exit surface of said extruder with its blade maintained at an angle to said exit surface of said extruder ranging from approximately 10° to 30°.

32. A method as set forth in claim 31 wherein said knife is inclined at angles ranging from 15° to 25°.

33. A method as set forth in claim 31 wherein said edge of said knife is resiliently urged in said contact whereby its sharpness is maintained.

34. A method as set forth in claim 31 wherein said antifriction means is provided by coating said surfaces with a tetrafluoroethylene polymer.

35. A method as set forth in claim 31 wherein said stream is directed substantially vertically downwardly for minimizing distortion as said articles are cut and deflected from it.

36. An apparatus for forming shaped articles of unbaked dough comprising a support, extrusion means upon said support for generating a shaped stream of said dough, an extrusion head upon said extrusion means, an extrusion plate upon said extrusion head including a shaped orifice through which said stream of dough flows, a knife means having a blade with a sharp edge, carriage means upon said support, said knife means being mounted upon said carriage means for passage across said extrusion plate, drive means, linking means connecting said drive means to said carriage means for actuating its movement, said carriage means being arranged to quickly push the sharp edge of said knife means in contact with and across said extrusion plate with said blade disposed at an angle to said extrusion plate whereby said shaped articles are cleanly severed and deflected from said stream without obstructing its flow through said orifice, antifriction means upon the surface of said blade remote from extrusion plate whereby the severed articles are caused to freely fall away from said blade, said carriage means comprises a reciprocating linkage, said linkage including means for pushing said knife means in a forward stroke in contact across said extrusion plate, and said linkage including retracting means for removing said knife means during its return stroke away from said extrusion plate and said stream of dough.

37. An apparatus as set forth in claim 36 wherein cushion means is mounted upon the end of said extrusion plate where said knife means returns into contact with it at the beginning of said forward stroke, and said cushion means being disposed for catching the portion of said blade in back of said edge before said edge contacts said extrusion plate whereby the impact of said edge upon said extrusion plate is cushioned.

38. An apparatus as set forth in claim 37 wherein said cushion means comprises pins of a strong smooth resilient material having a relatively low frictional resistance.

39. An apparatus as set forth in claim 38 wherein the ends of said pins that are contacted by said blade are disposed at said angle to said extrusion plate whereby they smoothly guide said knife means into contact with said extrusion plate at said angle.

40. An apparatus as set forth in claim 39 wherein said pins are disposed to catch said blade when its edge is approximately $\tfrac{1}{32}$-inch away from said extrusion plate.

41. An apparatus as set forth in claim 36 wherein said retracting means includes a cam means mounted upon said extrusion plate, and follower means are mounted upon said knife means for engaging said cam means.

42. An apparatus as set forth in claim 41 wherein said cam means comprises a bar having front and rear surfaces that are downwardly inclined away from said extrusion plate toward the forward end of said extrusion plate, loose coupling means attaching said bar upon said extrusion plate, and resilient means urging said bar into contact with said plate for allowing said bar to be moved away from the surface of said extrusion plate when said follower means enters between said bar and said extrusion plate during the forward stroke of said knife means and for causing said follower means to pass over said bar during the return stroke of said knife means thereby removing said knife means from said extrusion plate and said stream of dough during said return stroke of said knife.

43. An apparatus as set forth in claim 36 wherein said angle of said blade ranges approximately from 10 to 30°.

44. An apparatus as set forth in claim 36 wherein said angle of said blade ranges approximately from 15 to 25°.

45. An apparatus as set forth in claim 36 wherein said carriage means includes rotatable coupling means having an axis of rotation substantially parallel to the plane of said extrusion plate, said rotatable coupling means connecting said knife means to said reciprocating linkage, and resilient means reacting between said knife means and said carriage means for urging said edge into contact with said extrusion plate.

46. An apparatus as set forth in claim 45 wherein said linkage includes a knife-supporting bracket, said rotatable coupling means connecting said knife means to said bracket, and spring means reacting between said knife means and said bracket for resiliently urging said edge into contact with said extrusion plate.

47. An apparatus as set forth in claim 46 wherein reciprocating rod and bearing means mount said bracket upon said support, and said linking means comprise a crank and connecting rod.

48. An apparatus as set forth in claim 47 wherein said antifriction means is applied to both sides of said blade of said knife means to prevent said dough from sticking to it.

49. An apparatus as set forth in claim 48 wherein said antifriction means comprises a coating of a tetrafluoroethylene polymer.

50. An apparatus as set forth in claim 49 wherein said coating is approximately 1 to 2 mils thick.

References Cited

UNITED STATES PATENTS

| | | | |
|---|---|---|---|
| 2,403,476 | 7/1946 | Berry et al. | 18—8 |
| 2,655,876 | 10/1953 | Stickelber | 107—12 |
| 2,660,131 | 11/1953 | Elliott | 107—14 |
| 2,855,669 | 10/1958 | Duke | 30—350 |
| 2,977,902 | 4/1961 | Johannes | 107—69 |
| 3,071,856 | 1/1963 | Fischbein | 30—346.53 |
| 3,161,157 | 12/1964 | Fries | 107—29 |

FOREIGN PATENTS 435,276   4/1949   Italy.

WALTER A. SCHEEL, *Primary Examiner.*

J. SHEA, *Assistant Examiner.*

U.S. Cl. X.R.

18—12; 30—346.53; 83—701; 107—54, 69